United States Patent [19]

Szczesniak

[11] 4,015,025

[45] Mar. 29, 1977

[54] HYDROCOLLOIDS AS POTENTIATORS OF DIMETHYL SULFIDE FLAVOR

[75] Inventor: Alina Surmacka Szczesniak, Mount Vernon, N.Y.

[73] Assignee: General Foods Corporation, White Plains, N.Y.

[22] Filed: Sept. 24, 1974

[21] Appl. No.: 508,956

[52] U.S. Cl. .............................. 426/575; 426/535; 426/650; 426/654

[51] Int. Cl.[2] ........................................ A23L 1/226

[58] Field of Search .......... 426/169, 175, 221, 222, 426/350, 89, 103, 575, 650, 534, 654, 535

[56] References Cited

UNITED STATES PATENTS 3,554,768  1/1971  Feldman ........................ 426/175 X 3,736,149  5/1973  Knapp ........................... 426/175 X

OTHER PUBLICATIONS

McNeely et al., Industrial Gums, (1973), pp. 55–57 and 65–67.

Primary Examiner—A. Louis Monacell
Assistant Examiner—Esther L. Massung
Attorney, Agent, or Firm—Thaddius J. Carvis; Daniel J. Donovan; Bruno P. Struzzi

[57] ABSTRACT

The flavor intensity of acetaldehyde and dimethyl sulfide is potentiated by combining the same with a small but effective amount of alginate.

4 Claims, No Drawings

HYDROCOLLOIDS AS POTENTIATORS OF DIMETHYL SULFIDE FLAVOR

BACKGROUND OF THE INVENTION

The present invention relates to flavoring compositions. More particularly, the invention relates to the ability of alginates to augment the flavor potentiating properties of acetaldehyde and the flavorful qualities of dimethyl sulfide.

There is little available information on how specific hydrocolloids affect flavor and taste intensity. The use of such colloids with flavoring agents has most often been concerned with fixation of these natural concentrates or synthetic ingredients for the purpose of offsetting the volatility and/or reactivity of the same. Perhaps the best known flavoring agent in the class of volatile flavoring means is acetaldehyde.

The practice of fixing acetaldehyde with gums in order to preserve its volatile flavor and prevent its loss on storage in dry mixes is well known in the art. For example, U.S. Pat. No. 3,554,768 issued Jan. 12, 1971 speaks in terms of fixing acetaldehyde in a hydrophilic colloid not containing free amine groups. The concentrations taught in the Feldman patent range from 1:3 to 1:4 parts by weight of acetaldehyde to carbohydrate which are representative of concentrations commonly employed in foodstuffs containing both components.

U.S. Pat. No. 3,264,114 issued Aug. 2, 1966 similarly teaches the fixation of acetaldehyde and analogous volatile flavoring agents in arabinogalactan (larch gum). The ratio of arabinogalactan to acetaldehyde used for part of the flavoring material is 1:1, preferably 3–6:1.

U.S. Pat. No. 3,736,149 issued May 29, 1973 teaches, in addition, the fixation of acetaldehyde in a matrix material comprising lactose, hydrocolloid gum, and a starch hydrolysate.

SUMMARY OF THE INVENTION

It has been found that alginate, when placed in aqueous solution with acetaldehyde, dimethyl sulfide and combinations thereof, works to enhance the flavor potentiating properties of the acetaldehyde and the flavor of dimethyl sulfide. Surprisingly, of the known flavoring agents evaluated, only acetaldehyde and dimethyl sulfide were found to be potentiated by alginate.

Alginate has been found to potentiate the flavor of these two flavorants at any useful level in beverages, whether liquid or dry mixes, desserts, dairy products, tomato-containing and tomato-flavored products and the like without changing the desirable physical and flavorful properties of such food systems. Thus, alginate is incorporated in an effective amount in food and beverage systems which contain acetaldehyde and/or dimethyl sulfide in order that the acetaldehyde effect on flavor, and the dimethyl sulfide flavor itself are potentiated. The concentration of alginate to acetaldehyde usually ranges from about 10:1 to about 120:1 by weight of the gum to flavorant. It should be noted that where the foodstuff is a primarily liquid system such as a beverage, soup or the like or dry powder for preparation of the same, it is preferred that the amount of aliginate employed be minimized in order to preserve the desired viscosity and mouthfeel of the liquid foodstuff.

The mechanism of this invention is not immediately understood but it is hypothesized that both the reduced odor and increased flavor intensity of these flavorants is due to the unique ability of alginate to prevent the escape of small volatile flavorant molecules from the solution. It is also hypothesized that this phenomenon occurs due to the entanglement of the small flavorant molecules by the large alginate molecules having a configuration uniquely conducive to said phenomenon. This causes a greater retention of the flavor compound in solution which in turn lowers the vapor pressure over the sample leading to reduced odor intensity. Similarly, the ability of this gum to hold the acetaldehyde and dimethyl sulfide in solution results in an increased flavor intensity due to greater concentration of the flavorant. Due to the fact the acetaldehyde and dimethyl sulfide flavor-potentiating effect of alginate is demonstrated in aqueous-based systems, this invention finds utility in foodstuffs which are consumed in moist condition.

Accordingly, the principal object of this invention is to provide flavoring compositions.

DESCRIPTION OF THE INVENTION

The present invention is based on the discovery that alginate, particularly sodium alginate, when combined with acetaldehyde, dimethyl sulfide or combinations thereof, augments the flavor potentiating effect of acetaldehyde on food flavors, particularly fruit flavors and the inherent flavor qualities of dimethyl sulfide.

The data in Table I are the results derived from a study conducted to determine what effect sodium alginate has on the flavor and odor-intensity of certain volatile flavoring agents.

Each of four concentrations (0.06, 0.12, 0.20 and 0.24 g/100 ml water) of alginate was combined with each of the three concentrations (0.002, 0.008 and 0.016 g/100 ml water) of acetaldehyde and each of three concentrations of dimethyl sulfide (0.00015, 0.003, 0.006). Acetophenone and butyric acid were evaluated in the same manner at three different concentrations: acetophenone at 0.0015, 0.003, 0.006 and butyric acid at 0.005, 0.02, and 0.04.

The direction of the arrows symbolize enhanced or depressed intensity due to the presence of sodium alginate.

TABLE I

Effect of Sodium Alginate Addition On Flavor (F) And Odor (O) Intensity

| Flavorants | Sodium Alginate |
|---|---|
| Acetaldehyde | O** ↕ <br> F*** |
| Acetophenone | O NS <br> F NS |

TABLE I-continued

Effect of Sodium Alginate Addition On Flavor (F) And Odor (O) Intensity

| Flavorants | Sodium Alginate |
|---|---|
| Butyric Acid | O NS <br> F*** ↓ |
| Dimethyl Sulfide | O** ↓ <br> F*** ↑ |

Significance is indicated on a level of confidence basis as:
* for P 0.05
** for P 0.01
*** for P 0.001
NS for not significant As evidenced in Table I, the general effect in terms of odor alternation was a reduction in the odor intensity of the flavoring agent.

Sodium alginates effect on the flavor intensity of acetaldehyde and dimethyl sulfide was surprising. It appears that the altering effects of sodium alginate on the odor and flavor intensity of aromatic flavor compounds is specific for each flavorant. Foreseeably, therefore, other aromatic flavors not evaluated may be similarly potentiated by the alginates. Accordingly, a study was conducted to determine the relationship of the flavor intensification of acetaldehyde and dimethyl sulfide to the concentration of these flavorants and alginate present. Sodium alginate was tested at relatively broad ranges of concentration for the purpose of determining whether the degree of flavor potentiation had any direct relation to the amount of gum present.

TABLE II

Flavor Intensity Of Acetaldehyde on the Basis of Concentration Of Hydrocolloid

| Sodium Alginate Concentration | Acetaldehyde Concentration | | |
|---|---|---|---|
| | 0.002 % | 0.008 % | 0.016 % |
| 0 | 2.40 | 3.75 | 4.25 |
| 0.06 | 3.05 | 4.15 | 4.00 |
| 0.12 | 3.50 | 4.25 | 4.60 |
| 0.20 | 3.75 | 5.80 | 4.95 |
| 0.24 | 4.40 | 5.80 | 4.95 |

As Table II indicates, sodium alginate potentiated the effect of acetaldehyde flavor with increased potentiation obtained as the concentration of alginate increased. Similarly, each of three concentrations of dimethyl sulfide (0.00015%, 0.0003%, and 0.0006%) was evaluated against each of the same five concentrations of sodium alginate (0%, .06%, 0.12%, 0.20% and 0.24%). Unlike acetaldehyde, the potentiating effect of sodium alginate on dimethyl sulfide was independent of the hydrocolloid concentration.

The flavoring compositions of this invention may be prepared in a manner known in the art as being effective to produce an intimate association of the gum and flavorant as by pre-mixing the flavorant with a carrier, for example, a dry alcohol such as mannitol or Sorbitol and thereafter mixing the alginate therewith, encapsulation of the flavorant in sodium alginate, coating of the same with alginate, codrying a solution of flavorant and sodium alginate or equivalent techniques. It is not critical how the combination of the essential components of this invention is effected.

This invention has the potential of making synthetically fruit-flavored products such as gelatins, jellies, beverages whether liquid or powdered, and carbonated or non-carbonated, confections, simulated fruits, fruit flavored cereals which are to be dispersed in milk and other such fruit flavored foodstuffs, as well as dairy and tomato-flavored systems taste natural while at the same time, allowing for an economical reduction in the amount of flavorant to be used in the flavor formulation. Such products may in addition be sweetened with sugar substitutes, for example, artificial sweeteners such as saccharin, cyclamate, and nutritive dipeptide sweeteners or their salts such as L-aspartyl-L-phenylalanine methyl ester, or mixtures thereof. These food products, in addition to having a natural flavor, would have a desirable reduction in caloric content. Use of the terms "food" and "food product" are intended to include those systems which also contain a carrier.

The above explanation is for the purpose of teaching those skilled in the art how to practice the invention. Upon reading the above disclosure, those skilled in the art will be aware of a number of modifications and variations. It is contemplated that these modifications and variations be included within the scope of the present invention which is defined by the following claims.

What is claimed is:

1. A method of potentiating the flavor of dimethyl sulfide in foodstuffs which are consumed in the moist or liquid state which method comprises combining alginate with dimethyl sulfide in a respective weight ratio of from about 10:1 to about 120:1 alginate to dimethyl sulfide, in combination with the foodstuff, the dimethyl sulfide thereby being enhanced in flavor in the moist or liquid foodstuff.

2. The method of claim 1 wherein the alginate is sodium alginate.

3. The method of claim 2 wherein the food contains a fruit flavor.

4. The method of claim 2 wherein the food contains a vegetable flavor.

* * * * *

UNITED STATES PATENT AND TRADEMARK OFFICE
CERTIFICATE OF CORRECTION

PATENT NO. : 4,015,025
DATED : March 29, 1977
INVENTOR(S) : Alina Surmacka Szczesniak It is certified that error appears in the above-identified patent and that said Letters Patent are hereby corrected as shown below:

Col. 3, at bottom of chart, the sentence reading

"Significance is indicated on a level of confidence basis as:"

should be as follows:

-- Significance is indicated on a level of confidence basis, P indicating the probability of obtaining the same or nearly the same results after repeated testing. --

Signed and Sealed this

Twenty-first Day of June 1977

[SEAL]

Attest:

RUTH C. MASON
Attesting Officer

C. MARSHALL DANN
Commissioner of Patents and Trademarks